（12）United States Patent
Wang et al.

(10) Patent No.: US 10,490,857 B2
(45) Date of Patent: Nov. 26, 2019

(54) WOUND CELL

(71) Applicant: DONGGUAN AMPEREX TECHNOLOGY LIMITED, Dongguan (CN)

(72) Inventors: Kefei Wang, Dongguan (CN); Qiao Zeng, Dongguan (CN); Qingfeng Yuan, Dongguan (CN); Jibin Geng, Dongguan (CN)

(73) Assignee: DONGGUAN AMPEREX TECHNOLOGY LIMITED, Dongguan, Guangdong Province (CN)

( * ) Notice: Subject to any disclaimer, the term of this patent is extended or adjusted under 35 U.S.C. 154(b) by 179 days.

(21) Appl. No.: 15/649,846

(22) Filed: Jul. 14, 2017

(65) Prior Publication Data

US 2018/0034109 A1  Feb. 1, 2018

(30) Foreign Application Priority Data

Aug. 1, 2016  (CN) .......................... 2016 1 0629113

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0459* (2013.01); *H01M 10/0525* (2013.01);
(Continued)

(58) Field of Classification Search
CPC .......... H01M 10/0587; H01M 10/125; H01M 10/286; H01M 10/0431; H01M 10/14; H01M 10/0459; H01M 10/0525
(Continued)

(56) References Cited

U.S. PATENT DOCUMENTS

| 2004/0232882 A1 | 11/2004 | Yanagawa et al. |
| 2005/0277018 A1* | 12/2005 | Kim ........................ H01M 2/16 429/120 |

(Continued)

FOREIGN PATENT DOCUMENTS

| CN | 202495547 U | 10/2012 |
| CN | 203800133 U | 8/2014 |
| CN | 205863313 U | 1/2017 |

OTHER PUBLICATIONS

Chinese Office Action for corresponding Chinese Application No. 201610629113.7, dated Feb. 24, 2018, pp. 1-12.

*Primary Examiner* — Gregg Cantelmo
(74) *Attorney, Agent, or Firm* — Tarolli, Sundheim, Covell & Tummino LLP (57) ABSTRACT

Provided is a wound cell, formed by successively stacking and winding of first separator, first electrode plate, second separator and second electrode plate from head ends thereof, the first separator is located at innermost side of the flat-shaped cell; a first and second electrode tab is electrically connected with the first and second electrode plate, respectively; the first and second electrode tabs are located on a flat plane of the flat-shaped cell along a length direction thereof and do not overlap each other in a thickness direction thereof; a distance from the first or second electrode tab to a tail end of the first or second current collector is no larger than ⅓ of total length of the first or second current collector, a sum of number of layers of the first separator and the second separator at the innermost side of the cell is no more than two.

7 Claims, 5 Drawing Sheets

(51) Int. Cl.
  *H01M 10/0525* (2010.01)
  *H01M 10/12* (2006.01)
  *H01M 10/14* (2006.01)
  *H01M 10/28* (2006.01)

(52) U.S. Cl.
  CPC ......... *H01M 10/125* (2013.01); *H01M 10/14* (2013.01); *H01M 10/286* (2013.01)

(58) Field of Classification Search
  USPC .......................................................... 429/94
  See application file for complete search history.

(56) References Cited

U.S. PATENT DOCUMENTS

| | | | | |
|---|---|---|---|---|
| 2007/0154806 | A1* | 7/2007 | Hirose | H01M 2/0257 |
| | | | | 429/209 |
| 2008/0233474 | A1* | 9/2008 | Son | H01M 2/0404 |
| | | | | 429/129 |
| 2009/0297929 | A1* | 12/2009 | Uchida | H01M 10/0431 |
| | | | | 429/94 |
| 2016/0218386 | A1* | 7/2016 | Park | H01M 10/052 |

\* cited by examiner

FIG. 1

(PRIOR ART)

FIG. 2

(PRIOR ART)

WOUND CELL

CROSS-REFERENCE TO RELATED APPLICATIONS

The present application claims priority to Chinese Patent Application No. 201610629113.7, filed on Aug. 1, 2016, the content of which is incorporated herein by reference in its entirety.

TECHNICAL FIELD

The present application relates to the field of secondary batteries and, in particularly, relates to a wound cell.

BACKGROUND

At present, the secondary battery widely applied in market generally consists of a cell and a casing. The cell is an active component, which is usually formed by stacking or winding of a positive electrode plate, a negative electrode plate and a separator arranged between the positive electrode plate and the negative electrode plate. The positive electrode plate includes a positive current collector and a positive active material coated on the surface of the positive current collector, the negative electrode plate includes a negative current collector and a negative active material coated on the surface of the negative current collector.

Figure 1:
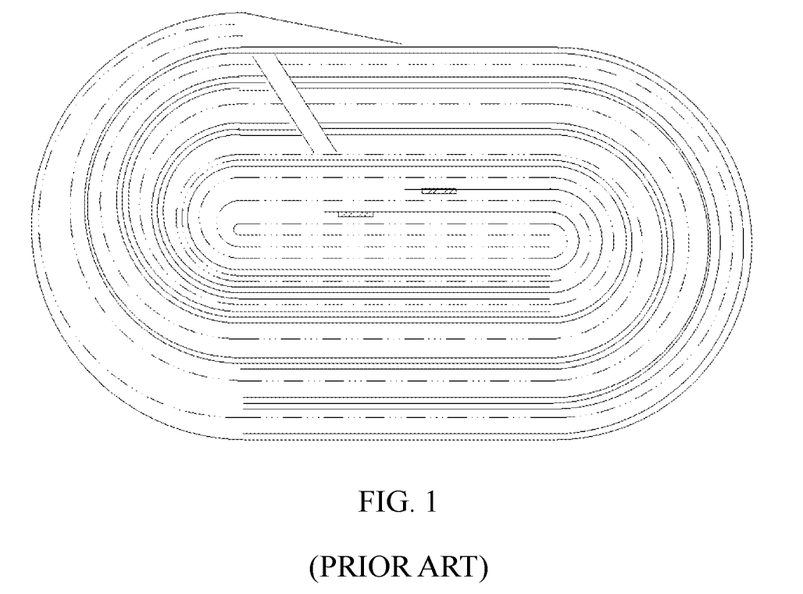
FIG. 1 is a structural schematic diagram of a wound cell in the prior art.
Figure 2:
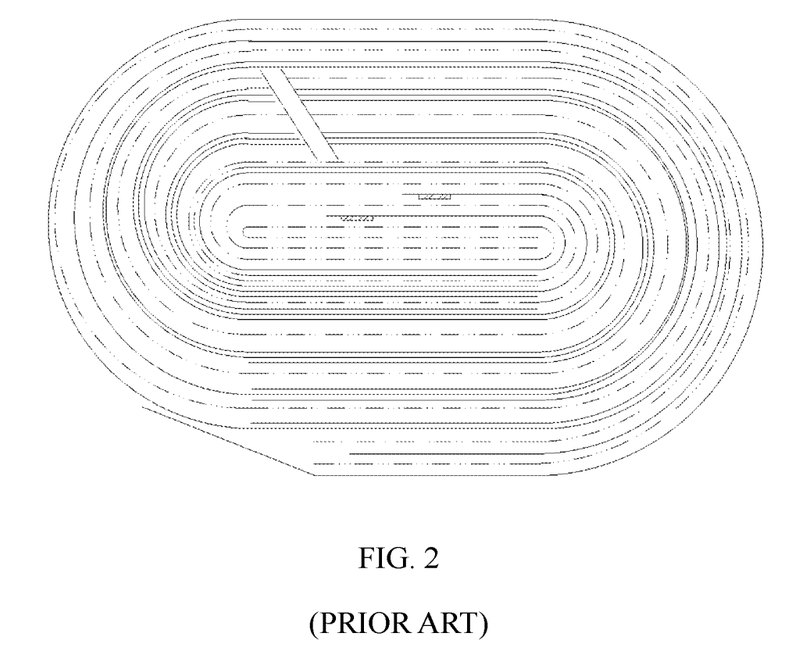
FIG. 2 is a structural schematic diagram of another wound cell in the prior art.

With the commercialization of the secondary cell, the market has much higher requirements on energy density of the cell, as shown in FIG. 1 and FIG. 2, in the interior of the wound cell, the separator needs to be wound individually, totally four layers of separator are successively stacked at the innermost side of the cell, which not only cause a waste of the separator, but also increase the thickness of the cell, thereby the energy density of the cell is reduced. Besides, the electrode tab is provided at the innermost side, i.e., the head portion, of the cell which will cause asymmetry of the cell structure, and lead to cell deformation.

Aiming at the defects of the prior art, the present application is proposed.

SUMMARY

The object of the present application is to provide a wound cell.

In order to achieve the inventive object of the present application, the technical solution adopted includes:

The present application relates to a wound cell, which is a flat-shaped cell formed by successively stacking and winding of a first separator, a first electrode plate, a second separator and a second electrode plate from head ends thereof, the first separator is located at an innermost side of the flat-shaped cell; the first electrode plate includes a first current collector with a first active material layer coated on a surface of the first current collector, the second electrode plate includes a second current collector with a second active material layer coated on a surface of the second current collector; a first electrode tab is electrically connected with the first electrode plate, and a second electrode tab is electrically connected with the second electrode plate; both the first electrode tab and the second electrode tab are located on a flat plane of the flat-shaped cell along a length direction of the cell, and neither the first electrode tab nor the second electrode tab overlap with each other in a thickness direction of the cell;

Preferably, a distance from the first electrode tab to a tail end of the first current collector is no larger than ⅓ of a total length of the first current collector, a distance from the second electrode tab to a tail end of the second current collector is no larger than ⅓ of a total length of the second current collector, the first separator and the second separator being successively stacked at the innermost side of the cell, in which the layer number of separator corresponding to the first electrode tab and/or the second electrode tab in the thickness direction is no more than two.

Preferably, the first separator includes a back folded section of the first separator and a separated section of the first separator which are successively arranged from a head portion to a tail portion thereof, the second separator includes a back folded section of the second separator and a separated section of the second separator which are successively arranged from a head portion to a tail portion thereof; the back folded section of the first separator and the back folded section of the second separator form a back folded portion of a separator, a back folding direction of the back folded portion of the separator is same as a winding direction of the flat-shaped cell, the first electrode tab or the second electrode tab is staggeredly arranged with respect to the back folded portion of the separator in the thickness direction of the flat-shaped cell.

Preferably, the back folded portion of the separator is located at an end of the innermost side of the flat-shaped cell in a width direction of the cell.

Preferably, the back folded portion of the separator is located between the first electrode tab and the second electrode tab in the thickness direction of the flat-shaped cell.

Preferably, a head portion of the second current collector is provided with a back folded section of the second current collector, the back folding direction of the back folded section of the second current collector is same as the winding direction of the flat-shaped cell, the back folded section of the second current collector does not overlap with the back folded portion of the separator, and the back folded section of the second current collector does not overlap with the first electrode tab or the second electrode tab in the thickness direction of the flat-shaped cell.

Preferably, the first current collector is defined between the separated section of the first separator and the separated section of the second separator.

Preferably, a start end of the first active material layer is level with a start end of the first current collector, a start end of the second active material layer is level with a start end of the second current collector, at least one surface of the first current collector is coated with the first active material layer, both surfaces of the second current collector are coated with the second active material layer.

Preferably, the first current collector is defined between the back folded section of the first separator and the back folded section of the second separator.

Preferably, at least one side of the first electrode tab along a length direction of the first current collector is provided with the first active material layer, at least one side of the second electrode tab along a length direction of the second current collector is provided with the second active material layer.

Preferably, the first electrode plate is a negative electrode plate, the second electrode plate is a positive electrode plate; or, the first electrode plate is a positive electrode plate, the second electrode plate is a negative electrode plate.

The technical solutions of the present application have at least the following beneficial effects:

The wound cell of the present application can save usage amount of the separator, improve energy density, as well as reduce cost. The electrode tab of the present application is arranged at the outer side of the cell, which increases the symmetry of the internal structure of the cell, reduce the risk of the cell deformation.

REFERENCE SIGNS

1—wound cell;
10—first separator;
101—back folded section of first separator;
102—separated section of first separator;
20—second separator;
201—back folded section of second separator;
202—separated section of second separator;
30—first electrode plate;
301—first current collector;
302—first active material layer;
40—second electrode plate;
401—second current collector,
402—second active material layer;
4011—back folded section of second current collector;
50—first electrode tab;
60—second electrode tab.

DESCRIPTION OF EMBODIMENTS

The present application will be further illustrated as follows with reference to specific embodiments. It should be understood that, these embodiments are only used to explain the present application but not used to limit the scope of the present application.

The present application relates to a wound cell 1, which is a flat-shaped cell formed by successively stacking and winding of a first separator 10, a first electrode plate 30, a second separator 20 and a second electrode plate 40 from head portions thereof, the first separator 10 is located at the innermost side of the flat-shaped cell 1.

The first electrode plate 30 includes a first current collector 301 and a first active material layer 302 coated on the surface of the first current collector 301, the second electrode plate 40 includes a second current collector 401 and a second active material layer 402 coated on the surface of the second current collector 401. A first electrode tab 50 is electrically connected with the first electrode plate 30, and a second electrode tab 60 is electrically connected with the second electrode plate 40. The first electrode tab 50 and the second electrode tab 60 are located on the flat plane of the flat-shaped cell 1 along the length direction, and do not overlap each other in the thickness direction.

The distance from the first electrode tab 50 to the tail end of the first current collector 301 is no larger than ⅓ of the total length of the first current collector 301, the distance from the second electrode tab 60 to the tail end of the second current collector 401 is no larger than ⅓ of the total length of the second current collector 401. The first separator 10 and the second separator 20 being successively stacked at the innermost side of the cell, in which the layer number of separator corresponding to the first electrode tab 50 and/or the second electrode tab 60 in the thickness direction is no more than two.

The flat-shaped cell of the present application is wound from the start end of the first separator 10 for 360 degrees to form a coil, of which the central line in the width direction of the cell is regarded as the innermost side of the flat-shaped cell.

The number of winding of the flat-shaped cell of the present application is at least 1.5, the first electrode tab 50 and the second electrode tab 60 will not be located at the first winding of the wound cell 1.

In the present application, the electrode tab is arranged at the outer side of the cell, which increases the symmetry of the internal structure of the cell, and reduces the risk of cell deformation. The first separator 10 and the second separator 20 being successively stacked at the innermost side of the cell, in which the layer number of separator corresponding to the first electrode tab 50 and/or the second electrode tab 60 in the thickness direction is no more than two. Therefore, it is unnecessary to successively stack 4 layers of separators, which can save the material and thickness of two layers of separators, and thus save cost, and also improve the volume energy density of the cell.

As an improvement of the wound cell 1 of the present application, at least one side of the first electrode tab 50 along the length direction of the first current collector 301 is provided with the first active material layer 302, at least one side of the second electrode tab 60 along the length direction of the second current collector 401 is provided with the second active material layer 402. The electrode tab can be arranged on a blank foil of the tail portion of the current collector. In order to further improve the volume energy density of the cell, and reduce the area of the blank foil, when the electrode tab is arranged at the position near the central portion of the current collector, both sides of the current collector along the length direction thereof are provided with active material layers, all the blank foil area arranged with the electrode tab can be provided with active material.

As an improvement of the wound cell 1 of the present application, the winding direction of the flat-shaped cell is anti-clockwise or clockwise, the specific winding direction is defined according to the device.

As an improvement of the wound cell 1 of the present application, there is at least one first electrode tab 50, and at least one second electrode tab 60. In the present application, since the electrode tab is arranged at the outer side of the cell, increasing of number of the electrode tab will not increase the risk of the cell deformation.

Figure 3:
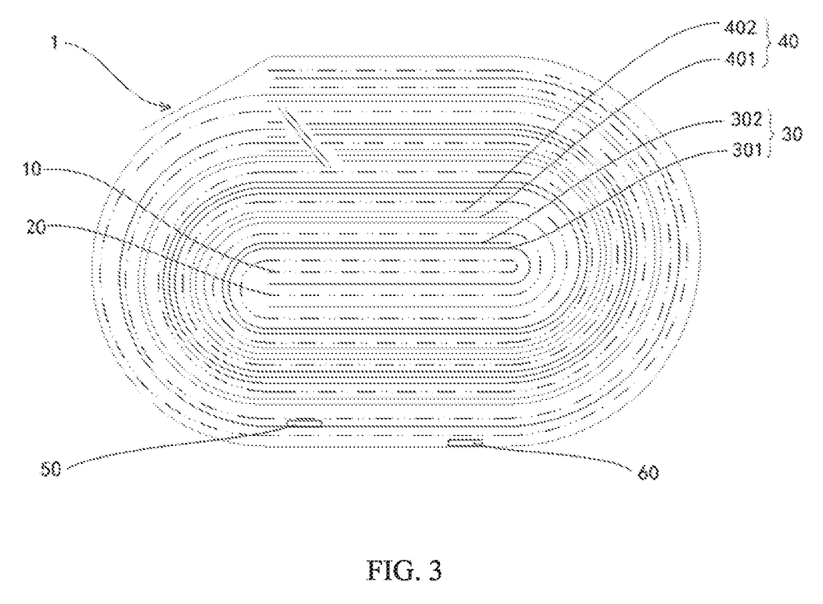
FIG. 3 is a structural schematic diagram of a wound cell according to an embodiment of the present application.
Figure 4:
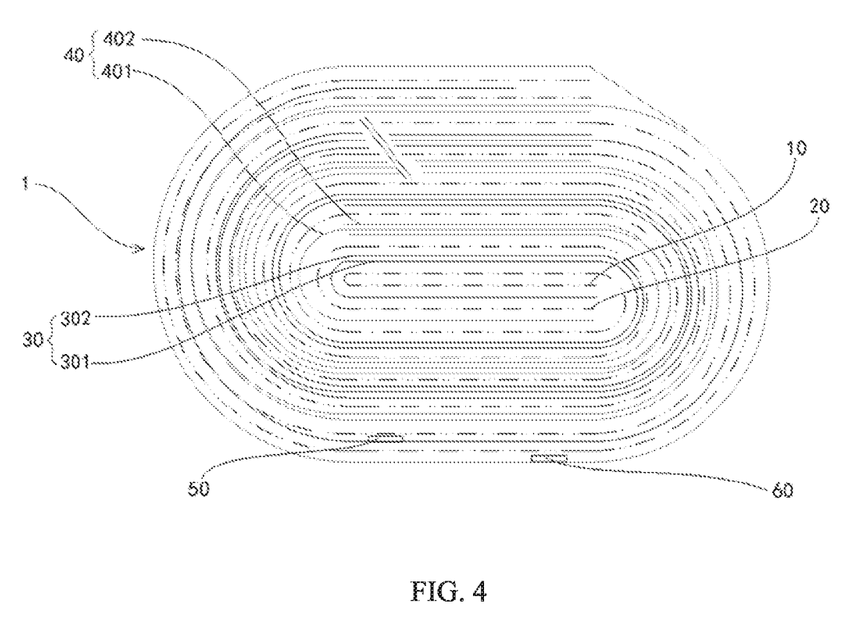
FIG. 4 is a structural schematic diagram of a wound cell according to an embodiment of the present application.

As an embodiment of the wound cell 1 of the present application, as shown in FIG. 3 and FIG. 4, the start end of the second current collector 401 can be level with the start end of the first current collector 301, or can be staggeredly arranged therewith. The start end of the first separator 10 and the start end of the second separator 20 are both level with the start end of the first current collector 301. That is, the innermost side of the battery includes two layers of first separators 10 which are successively stacked. FIG. 3 shows anti-clockwise winding, FIG. 4 shows clockwise winding. In the present embodiment, a layer of blank current collector is wound at the innermost side of the cell so as to facilitate preparation of the cell.

Figure 5:
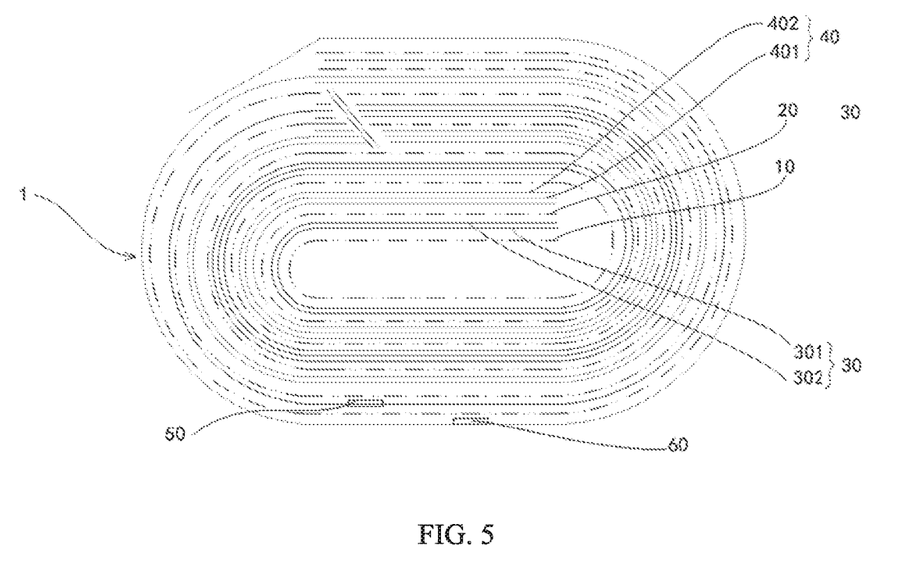
FIG. 5 is a structural schematic diagram of a wound cell according to an embodiment of the present application.

As another embodiment of the wound cell 1 of the present application, as shown in FIG. 5, the start end of the first active material layer 302 can be level with the start end of the first current collector 301, or can be staggeredly arranged therewith. The start end of the second active material layer 402 is level with the start end of the second current collector 401. The outer surface of the first current collector 301 is coated with the first active material layer 302, the inner and outer surfaces of the second current collector 401 are both coated with the second active material layer 402. That is, the electrode plate with both the inner and outer surfaces being coated with the active material layer are wound from the innermost side of the cell at the beginning, without winding a blank current collector at the innermost side of the cell, which can further improve the volume energy density of the cell. The start end of the active material layer can also be not level with the start end of the current collector, which can be designed according to actual situations.

Figure 6:
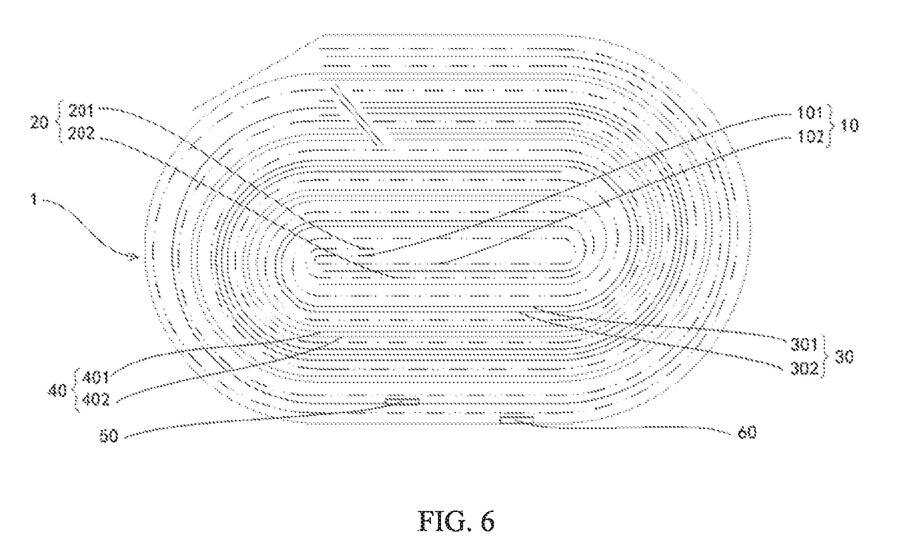
FIG. 6 is a structural schematic diagram of a wound cell according to an embodiment of the present application.

As still another embodiment of the wound cell 1 of the present application, as shown in FIG. 6, the first separator 10 includes a back folded section 101 of the first separator and a separated section 102 of the first separator successively arranged from the head portion to the tail portion, the second separator 20 includes a back folded section 201 of the second separator and a separated section 202 of the second separator successively arranged from the head portion to the tail portion. The back folding direction of the back folded portion of the separator is same as the winding direction of the flat-shaped cell, the first electrode tab 50 or the second electrode tab 60 is staggeredly arranged with respect to the back folded portion of the separator in the thickness direction of the flat-shaped cell, and thus will not increase the thickness of the cell. Comparing the design of the back folded portion of the separator with the embodiments shown in FIGS. 3-5, although there is little waste on raw material, the design of the back folding design of the separator can facilitate operation during the winding process of the cell, since the position of the electrode tab is the thickest portion of the cell, therefore, the design of the back folded portion of the separator will not affect the volume energy density. The back folded portion of the separator is located at the end of the innermost side of the cell in the width direction of the flat-shaped cell, the first current collector 301 is clamped between the separated section 102 of the first separator and the separated section 202 of the second separator.

Figure 7:
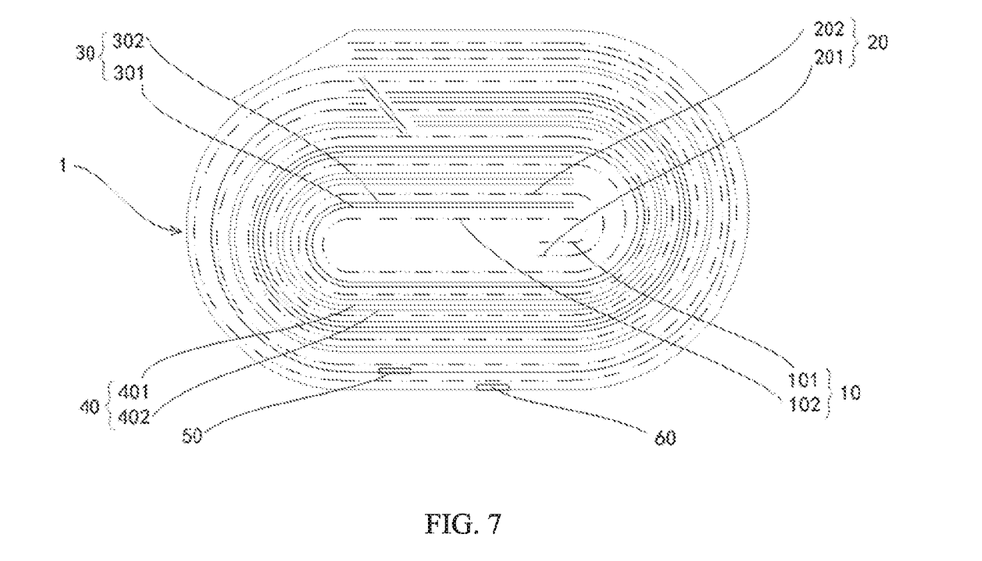
FIG. 7 is a structural schematic diagram of a wound cell according to an embodiment of the present application.

As still another embodiment of the wound cell 1 of the present application, as shown in FIG. 7, different from FIG. 6, the start end of the first active material layer 302 is level with the start end of the first current collector 301, and the start end of the second active material layer 402 is level with the start end of the second current collector 401. The outer surface of the first current collector 301 is coated with the first active material layer 302, both the inner and outer surfaces of the second current collector 401 are coated with the second active material layer 402.

Figure 8:
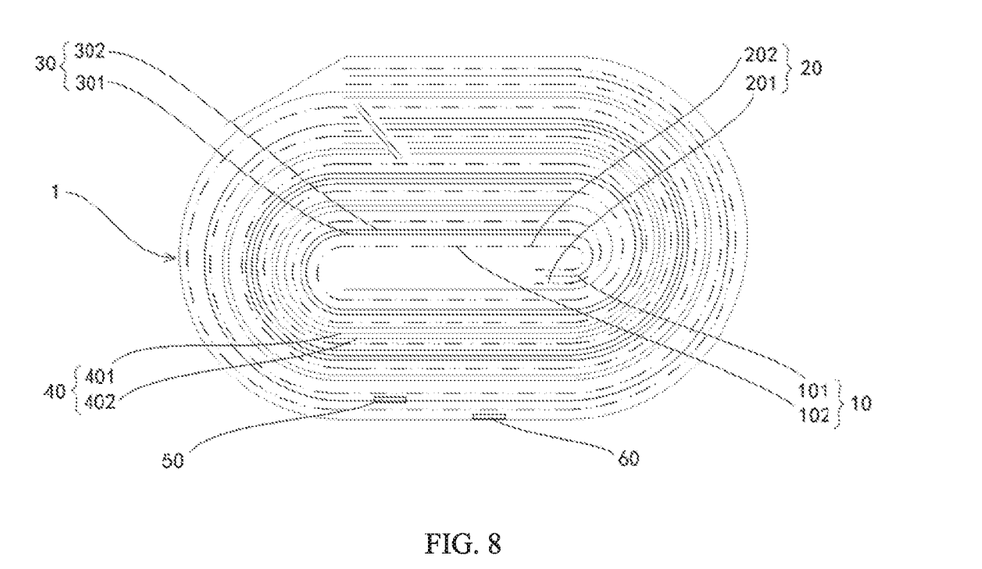
FIG. 8 is a structural schematic diagram of a wound cell according to an embodiment of the present application.

As still another embodiment of the wound cell 1 of the present application, as shown in FIG. 8, the first separator 10 includes a back folded section 101 of the first separator and a separated section 102 of the first separator, the second separator 20 includes a back folded section 201 of the second separator and a separated section 202 of the second separator. The back folded section 101 of the first separator and the back folded section 201 of the second separator form a back folded portion of the separator, the back folding direction of the back folded portion of the separator is same as the winding direction of the flat-shaped cell, the back folded portion of the separator is located at the end of the innermost side in the width direction of the flat-shaped cell, and the first electrode tab 50 or the second electrode tab 60 does not overlap in the thickness direction of the flat-shaped cell, and thus will not increase the thickness of the cell. The first current collector 301 is clamped between the back folded section 101 of the first separator and the back folded section 202 of the second separator. The outer surface of the first current collector 301 corresponding to the position of the separated portion of the separator is coated with the first active material layer 302, both the inner and outer surfaces of the second current collector 401 corresponding to the position of the separated portion of the separator are coated with the second active material layer 402.

Figure 9:
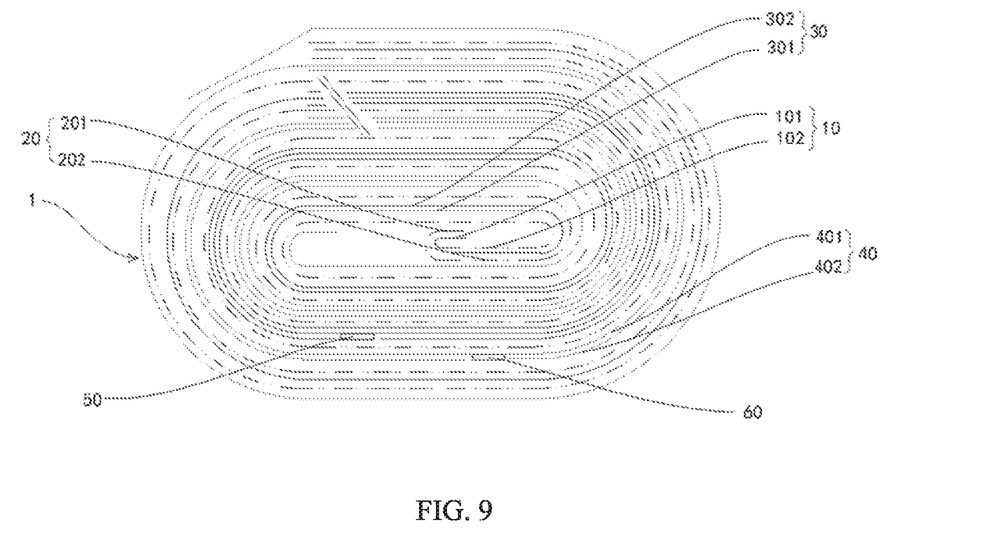
FIG. 9 is a structural schematic diagram of a wound cell according to an embodiment of the present application.

As still another embodiment of the wound cell 1 of the present application, as shown in FIG. 9, the first separator 10 includes a back folded section 101 of the first separator and a separated section 102 of the first separator, the second separator 20 includes a back folded section 201 of the second separator and a separated section 202 of the second separator, the back folded section 101 of the first separator and the back folded section 201 of the second separator form a back folded portion of the separator. The back folding direction of the back folded portion of the separator is same as the winding direction of the flat-shaped cell, the back folded portion of the separator is located between the first electrode tab 50 and the second electrode tab 60 in the thickness direction of the cell, and will not overlap the first electrode tab 50 and the second electrode tab 60, and thus will not increase the thickness of the cell. The first current collector 301 is clamped between the separated section 102 of the first separator and the separated section 202 of the second separator. Since the back folded portion of the separator is located at the center of the innermost side of the cell, the separated portion of the separator is being wound from the central portion of the inner side of the cell, and then bended, the first current collector 301 is clamped between the first separated section 102 of the first separator and the separated section 202 of the second separator, which will be wound together with the separator. In the present embodiment, both sides along the length direction of the current collector are provided with the active material layers.

Figure 10:
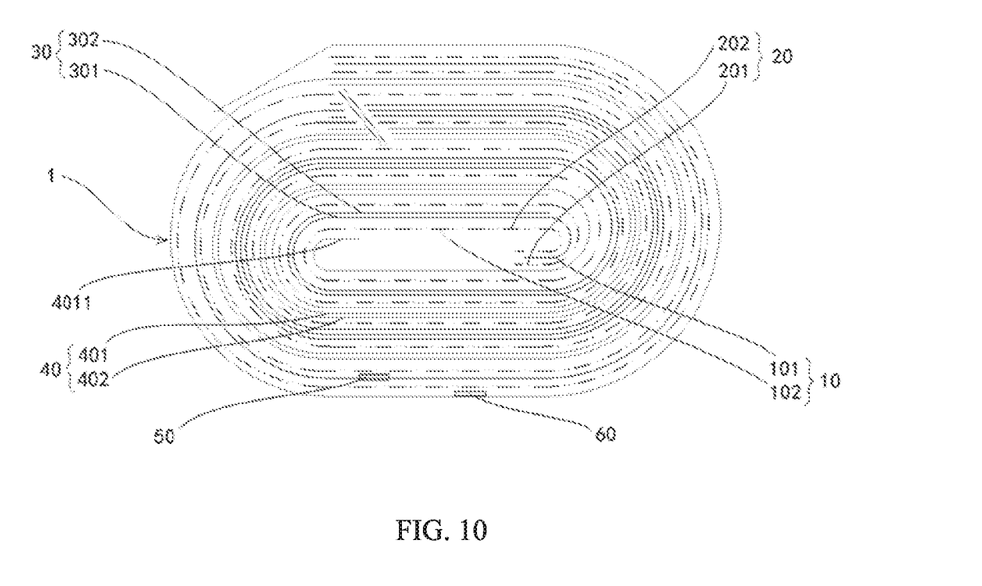
FIG. 10 is a structural schematic diagram of a wound cell according to an embodiment of the present application.

As still another embodiment of the wound cell 1 of the present application, as shown in FIG. 10, different from the FIG. 9, the head portion of the second current collector 401 is provided with a back folded section 4011 of a second current collector. The back folding direction of the back folded section 4011 of the second current collector is same as the winding direction of the flat-shaped cell. The back folded section 4011 of the second current collector does not overlap the back folded portion of the separator, and the back folded section 4011 of the second current collector does not overlap the first electrode tab 50 or the second electrode tab 60 in the thickness direction of the flat-shaped cell. Although the back folded section 4011 of the second current collector requires additional material, but it will facilitate the winding operation, and will not increase the thickness of the cell.

In the above embodiments, when the first electrode plate 30 is a negative electrode plate, the second electrode plate 40 is a positive electrode plate; or, when the first electrode plate 30 is a positive electrode plate, the second electrode tab 40 is a negative electrode plate. The length of the active material can be flexibly designed according to the selection of the first and second electrode plate, the length of the active material layer on the negative electrode plate can be larger than or equal to the length of the positive active material. According to design requirements, the first separator can be combined with the second separator as a same separator.

Although the present application is disclosed by the preferred embodiments as above, but they will not limit the claims. Those skilled in the art can make any possible variations and modifications according to the concept of the present application, therefore, the protection scope of the present application should be defined by the claims of the present application.

What is claimed is:

1. A wound cell, wherein the wound cell is a flat-shaped cell formed by successively stacking and winding of a first separator, a first electrode plate, a second separator and a second electrode plate from respective head ends thereof, the first separator is located at an innermost side of the flat-shaped cell; the first electrode plate comprises a first current collector with a first active material layer coated on a surface of the first current collector, the second electrode plate comprises a second current collector with a second active material layer coated on a surface of the second current collector; a first electrode tab is electrically connected with the first electrode plate, and a second electrode tab is electrically connected with the second electrode plate; both the first electrode tab and the second electrode tab are located on a flat plane of the flat-shaped cell along a length direction of the cell, and neither the first electrode tab nor the second electrode tab overlap with each other in a thickness direction of the cell;

wherein a distance along a winding track of the first current collector between the first electrode tab and an outermost tail end of the first current collector is no larger than ⅓ of a total length of the first current collector along the winding track of the first current collector, a distance along a winding track of the second current collector between the second electrode tab and an outermost tail end of the second current collector is no larger than ⅓ of a total length of the second current collector along the winding track of the second current collector, the first separator and the second separator being successively stacked at the innermost side of the cell in which a layer number of separator corresponding to the first electrode tab and/or the second electrode tab in thickness direction is no more than two, the first separator comprises a back folded section of the first separator and a separated section of the first separator, the back folded section of the first separator being located at the innermost side of the wound cell and extending to the separated section of the first separator while being bent along a winding direction of the wound cell;

the second separator comprises a back folded section of the second separator and a separated section of the second separator, the back folded section of the second separator being located at the innermost side of the wound cell and extending to the separated section of the second separator while being bent along the winding direction of the wound cell;

the back folded section of the first separator and the back folded section of the second separator form a back folded portion of a separator, the first electrode tab or the second electrode tab is staggeredly arranged with respect to the back folded portion of the separator in the thickness direction of the flat-shaped cell, the first current collector is defined between the back folded section of the first separator and the back folded section of the second separator.

2. The wound cell according to claim 1, wherein the back folded portion of the separator is located at an end of the innermost side of the flat-shaped cell in a width direction of the cell.

3. The wound cell according to claim 1, wherein the back folded portion of the separator is located between the first electrode tab and the second electrode tab in the thickness direction of the flat-shaped cell.

4. The wound cell according to claim 3, wherein a head portion of the second current collector is provided with a back folded section of the second current collector, the back folding direction of the back folded section of the second current collector is same as the winding direction of the flat-shaped cell, the back folded section of the second current collector does not overlap with the back folded portion of the separator, and the back folded section of the second current collector does not overlap with the first electrode tab or the second electrode tab in the thickness direction of the flat-shaped cell.

5. The wound cell according to claim 3, wherein the first current collector is defined between the separated section of the first separator and the separated section of the second separator.

6. The wound cell according to claim 5, wherein a start end of the first active material layer is level with a start end of the first current collector, a start end of the second active material layer is level with a start end of the second current collector; at least one surface of the first current collector is coated with the first active material layer, both surfaces of the second current collector are coated with the second active material layer.

7. The wound cell according to claim 1, wherein at least one side of the first electrode tab along a length direction of the first current collector is provided with the first active material layer, at least one side of the second electrode tab along a length direction of the second current collector is provided with the second active material layer.

* * * * *